United States Patent Office 3,672,978
Patented June 27, 1972

3,672,978
METHOD OF RENDERING TEXTILE MATERIALS ABSORPTIVE
Rudi Widder, Eppelheim, and Harry Distler and Friedrich Fuchs, Ludwigshafen, Germany, assignors to Badische Anilin- & Soda-Fabrik Aktiengesellschaft, Ludwigshafen (Rhine), Germany
No Drawing. Filed Feb. 17, 1970, Ser. No. 12,127
Claims priority, application Germany, Feb. 22, 1969, P 19 08 966.8
Int. Cl. D06m 13/26
U.S. Cl. 117—139.5 CQ  5 Claims

ABSTRACT OF THE DISCLOSURE

Textile materials are rendered absorptive by impregnation with a sulfitobetaine containing an aliphatic hydrocarbon radical of medium chain length.

---

This invention relates to a method of improving the absorptivity and rewetting properties of textile materials by means of certain sulfitobetaines containing an aliphatic hydrocarbon radical having 8 to 17 carbon atoms.

Textile materials in many cases exhibit inadequate wettability and absorptivity with respect to water and aqueous treatment baths. This constitutes a serious disadvantage in the numerous wet treatments involved in the manufacture and processing of textile materials and is also a substantial drawback in many applications of the textile materials. Attempts have already been made to improve the absorptivity and wettability of textile materials by treating them with solutions of certain surfactants, so-called rewetting agents, followed by drying the treated material. However, the effect achieved with rewetting agents hitherto disclosed is frequently inadequate.

It is an object of the invention to render textile materials absorptive and rewettable more efficiently than hitherto. It is a further object of the invention to improve the rot-proof characteristics of textile materials.

These objects are achieved in accordance with the present invention by using substances of the general formula

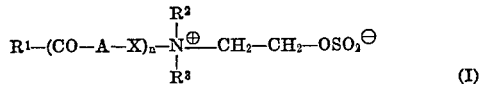

(I)

for rendering textile materials absorptive, in which formula $R^1$ stands for an aliphatic hydrocarbon radical of 8 to 17 carbon atoms, $R^2$ and $R^3$ each stands for low molecular weight alkyl radicals, A stands for —NH— or —O—, X stands for a low molecular weight alkylene radical and $n$ is equal to 0 or 1. Rewetting agents of this general Formula I are particularly valuable when the said low molecular weight radicals contain up to 5 carbon atoms. We prefer substances of the general Formula I in which $R^2$ and $R^3$ are methyl groups and X is an ethylene or propylene radical.

The substances of the general Formula I may be simply obtained by reacting amino compounds of the general formula $$R^1-(CO-A-X)_n-\underset{R^3}{\overset{R^2}{N}}$$

(II)

where $R^1$, $R^2$, $R^3$, A, X and $n$ have the meanings stated above, with glycol sulfite

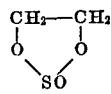

The starting materials of Formula II are generally reacted with the 1,2-glycol sulfite in stoichiometric amounts. It is possible, however, to use the starting amino of Formula II in excess, for example in amounts of up to 2 moles for each mole of glycol sulfite. The glycol sulfite may be prepared, for example, by reacting ethylene oxide with sulfur dioxide by the process described in German printed application DAS 1,251,769.

Alternatively, compounds may be used for the reaction which form 1,2-glycol sulfite during the reaction, for example poly(1,2-glycol sulfite). The poly(1,2-glycol sulfite) may be prepared, for example, by reacting ethylene oxide with sulfur dioxide at 0° C.

The reaction will usually be carried out at a temperature between —10° and +200° C., preferably between 20° and 150° C., and may be effected at atmospheric or elevated pressures, continuously or batchwise. It is convenient to use solvents which are inert under the conditions of the reaction, for example water; alcohols such as methanol, butanol and cyclohexanol; aromatic hydrocarbons, such as benzene, toluene, xylene, nitrobenzene and chlorobenzene; ketones such as acetone; and chlorinated hydrocarbons, such as chloroform and ethylene chloride, or mixtures thereof.

The reaction may be carried out as follows. A mixture of the starting material of Formula II and glycol sulfite optionally containing a solvent or solvents is heated at the reaction temperature for a period of from 0.5 to 6 hours. The products are then isolated from the reaction mixture by usual means, such as filtration or fractional distillation.

In the method of the invention the substances of the general Formula I may be applied to the textile material from solution and preferably from aqueous solution by dipping, padding or spraying once or a number of times. We have found it convenient to operate so that the textile material retains less than 1% and preferably from 0.005 to 0.5% of its dry weight of the substance applied thereto. The best results are obtained when the amount of substance of the general Formula I which remains on the textile material is equal to 0.05 to 0.25% of the dry weight of the textile material, generally speaking. The thus impregnated or sprayed textile material may then be rinsed in water and is finally dried in the usual manner. The textile material so treated is notable for its excellent rewettability and absorptive capacity; in addition, it shows anti-rot properties due to the fungicidal and bactericidal activity of the substances of the general Formula I.

Textile materials which may be rendered absorptive with the substance of the general Formula I are any materials which contain organic fibrous material, such as cellulose ester fibers, or synthetic fibrous material, such as polyamide, polyester, polyacrylonitrile and polyolefin fibers, or natural fibrous material, such as wool and silk fibers, and above all cellulose and regenerated cellulose fibers.

The invention is further illustrated by the following example in which the percentages are by weight.

EXAMPLE

The following substances were used for rendering cotton fabrics absorptive:

(a) 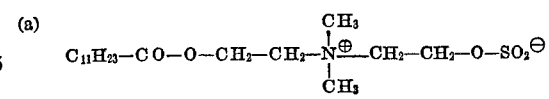

(b) 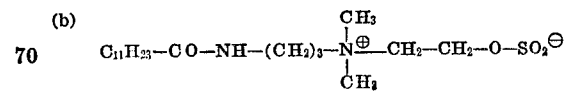

(c) 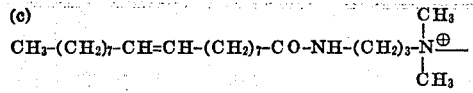

(d) 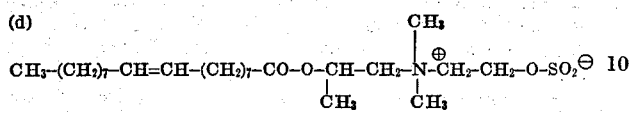

(e) 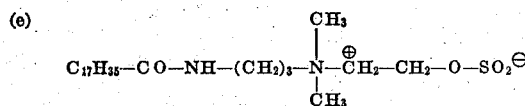

(f) 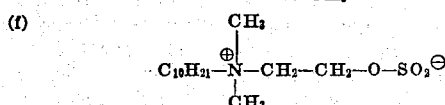

(g) 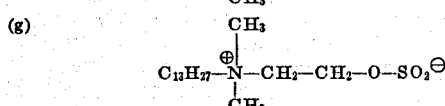

(h) 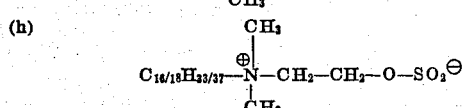

(i) a mixture of dodecyl- and tetradecyl-dimethylbenzyl ammonium chloride in the form of a commercially available surfactant having marked rewetting properties.

Pieces of cotton fabric of the same source and size are immersed in aqueous solutions of the substances (a) to (f) (in concentrations of 1, 3 and 5 g./l.) at a liquor ratio of 10:1 for 30 seconds and are then squeezed in a padding machine to a wet pickup of 50%. This procedure is repeated. The pieces of fabric are then rinsed in distilled water at the same liquor ratio, padded and squeezed to the same wet pickup.

The treated fabric is then dried at 50° to 60° C. in a drying cabinet. Round discs of fabric having a diameter of 3 cm. are punched out of the treated pieces of fabric, and these discs are used for measurements of the wetting times in distilled water by the funnel method (cf. Schwen, "Die Bedeutung der anwendungstechnischen Prüfmethoden für die Textilveredlung und ihre Normung im Hinblick auf Farbstoffe und oberflächenaktive Hilfsmittel" in "Zeitschrift für die gesamte Textilindustrie," 61 (1959), Nos. 11 and 12). This test is carried out as follows: the discs of fabric are placed on the surface of the water and pushed below the surface by means of a funnel. The time taken for the sample to sink, as measured from the instant of immersion, the "sinking time," is measured with a stop clock. Measurements are made on 10 samples of each material and the mean is taken of the 10 test results.

The following table lists said mean results for each of the various tests and shows the marked superiority of the substances used in accordance with the present invention.

TABLE

| Substance: | Sinking time in seconds at— | | |
|---|---|---|---|
| | 1 g./l. | 3 g./l. | 5 g./l. |
| a | 4.4 | 3.5 | 2.9 |
| b | 33 | 24 | 20 |
| c | 43 | 18 | 12 |
| d | 185 | 44 | 25 |
| e | 17 | .7 | 4.5 |
| f | 300 | 57 | 43 |
| g | 300 | 34 | 15 |
| h | 205 | 34 | 32 |
| i | 295 | 143 | 53 |

We claim:
1. A method of improving the absorptivity and rewettability of textile materials comprising applying to the textile material at least one substance of the general formula

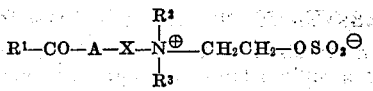

in which $R^1$ represents an aliphatic hydrocarbon radical of 8 to 17 carbon atoms, $R^2$ and $R^3$ represent low molecular weight alkyl radicals, A represents —NH— or —O—, and X represents low molecular weight alkylene radical, in an amount of less than 1% by weight of the dry weight of the textile material, and drying the textile material.

2. A process as claimed in claim 1 wherein $R^2$ and $R^3$ represent methyl and X represents ethylene or propylene.

3. A process as claimed in claim 1 wherein the substance of said formula is applied to the textile material in an amount of from 0.005 to 0.5% by weight of the dry weight of the textile material.

4. A process as claimed in claim 1 wherein the substance of said formula is applied in an amount of from 0.5 to 2.5% by weight of the dry weight of the textile material.

5. A process as claimed in claim 1 wherein said substance of said formula is (2-lauroyloxyethyl)-dimethyl-(2-sulfitoethyl)-ammonium inner salt, (3-lauroylaminopropyl)-dimethyl-(2-sulfitoethyl)-ammonium inner salt, (3-oleoylaminopropyl)-dimethyl-(2-sulfitoethyl)-ammonium inner salt, (2-oleoyloxypropyl)-dimethyl-(2-sulfitoethyl)-ammonium inner salt or (2-stearoylaminopropyl)-dimethyl-(2-sulfitoethyl)-ammonium inner salt.

References Cited

UNITED STATES PATENTS

| 3,168,546 | 2/1965 | Ballauf et al. | 260—456 |
| 2,195,194 | 3/1940 | Ulrich et al. | 117—139.5 |
| 2,836,517 | 5/1958 | Gruber et al. | 117—139.5 X |
| 2,878,144 | 3/1959 | Conbere et al. | 117—139.5 |
| 3,507,690 | 4/1970 | Walker | 117—139.5 |

WILLIAM D. MARTIN, Primary Examiner

T. G. DAVIS, Assistant Examiner

U.S. Cl. X.R.

117—138.8 E, 138.8 F, 138.8 N, 138.8 UA, 141, 143 R, 144